US012001173B2

(12) United States Patent
Lin et al.

(10) Patent No.: US 12,001,173 B2
(45) Date of Patent: Jun. 4, 2024

(54) LCD AND LED HYBRID DISPLAY SCREEN AND LCD AND LED CLOCK WITH LCD AND LED HYBRID DISPLAY SCREEN

(71) Applicant: Yuguang Lin, Toronto (CA)

(72) Inventors: Yuguang Lin, Toronto (CA); Jinjun Zhu, Zhejiang (CN)

(73) Assignee: Yuguang Lin, Toronto (CA)

( * ) Notice: Subject to any disclaimer, the term of this patent is extended or adjusted under 35 U.S.C. 154(b) by 519 days.

(21) Appl. No.: 17/356,505

(22) Filed: Jun. 23, 2021

(65) Prior Publication Data

US 2022/0066396 A1 Mar. 3, 2022

Related U.S. Application Data

(63) Continuation of application No. PCT/CN2020/113028, filed on Sep. 2, 2020.

(51) Int. Cl.

*G09F 9/302* (2006.01)
*G04G 9/10* (2006.01)
*G04G 9/12* (2006.01)

(52) U.S. Cl.

CPC ................ *G04G 9/10* (2013.01); *G04G 9/12* (2013.01); *G09F 9/3023* (2013.01)

(58) Field of Classification Search

CPC ................................ G09F 9/3023; G04G 9/10

See application file for complete search history.

(56) References Cited

U.S. PATENT DOCUMENTS

2011/0063276 A1* 3/2011 Tan ...................... G09G 3/3426 345/212
2015/0077653 A1* 3/2015 Manan .................. G02F 1/1336 349/12

FOREIGN PATENT DOCUMENTS

CN 201600531 U 10/2010
CN 202093785 U 12/2011
CN 103035205 A 4/2013
JP 2004004845 A * 1/2004 ........... G02B 5/0221

* cited by examiner

*Primary Examiner* — Joseph L Williams

(57) ABSTRACT

A LCD and LED hybrid display screen has a LCD display screen, a LED display screen overlapping with the LCD display screen, and a drive device for driving the LCD display screen and the LED display screen. The LED display screen has at least one LED pattern and each LED pattern comprises a plurality of strokes is corresponding to at least one LED lamp. The drive device drives the LCD display screen to display at least one LCD display pattern and driving the LED lamp to emit light. A LED display pattern formed by a light emitted by the LED lamp and the LCD display pattern are in one-to-one correspondence. A LCD and LED clock with a LCD and LED hybrid display screen is further provided. Different ambient brightness can be adapted while the power consumption can be reduced through overlapping the LCD display screen with the LED display screen.

8 Claims, 7 Drawing Sheets

LCD AND LED HYBRID DISPLAY SCREEN AND LCD AND LED CLOCK WITH LCD AND LED HYBRID DISPLAY SCREEN

CROSS REFERENCE TO RELATED APPLICATIONS

The present application is a Continuation Application of PCT Application No. PCT/CN2020/113028 filed on Sep. 2, 2020, the contents of which are incorporated herein by reference in their entirety.

TECHNICAL FIELD

The present disclosure relates generally to a display screen technology field, and more particularly, to a LCD and LED hybrid display screen, and a LCD and LED clock with a LCD and LED hybrid display screen.

BACKGROUND

With the development and progress of the modern society, the clock has entered thousands of households. However, the clocks in the modern mark always adopt a LCD (Liquid Crystal Display) display screen, or a LED (Light Emitting Diode) digital display screen. However, the LCD display screen cannot be read for the time when the ambient brightness is not enough, and other lighting devices should be provided. Therefore, it loses its required usage in the night or dark environment, which is very inconvenient to use. However, the power consumption of the LED digital display screen is huge, so it usually needs to be connected with the power adapter to keep lightening for a long time, resulting in a large energy waste. In additional, when the ambient brightness is very strong, the contrast of LED digital display screen becomes worse, resulting in a fuzzy display of time. Accordingly, the user cannot read the time accurately.

SUMMARY

The object of the present application is to provide a LCD and LED hybrid display screen, and a LCD and LED clock with a LCD and LED hybrid display screen, which are capable of adapting the different ambient brightness and reducing the power consumption, aiming at the technical problems in the prior art.

In a first aspect, a LCD and LED hybrid display screen is provided, which comprising a LCD display screen, a LED display screen arranged at a back side of the LCD display screen and overlapping with the LCD display screen, and a drive device for driving the LCD display screen and the LED display screen, wherein the LED display screen is provided with at least one LED pattern, wherein each LED pattern comprises a plurality of strokes and each stroke is corresponding to at least one LED lamp; wherein the drive device is used for driving the LCD display screen to display at least one LCD display pattern and driving the LED lamp to emit light, wherein a LED display pattern formed by a light emitted by the LED lamp and the LCD display pattern are in one-to-one correspondence.

Preferably, the LED display pattern and the LCD display pattern are a display number.

Preferably, the display number comprises at least three 8-shaped display numbers composed of seven strokes and at least one 1-shaped display number composed of at least one stroke, or at least three 8-shaped display numbers composed of seven strokes and at least one reversed S-shaped composed of six strokes, or at least four 8-shaped display numbers composed of seven strokes.

Preferably, the LCD display screen is a negative LCD display screen, the drive device comprises a digital display module for generating a digital display control signal, a LCD display control module for driving the negative LCD display screen to generate the LCD display pattern displaying the display number based on the digital display control signal, and a LED display control module for driving the LED lamp of corresponding stroke in the LED pattern to emit light to generate the LED display pattern displaying the display number based on the digital display control signal.

Preferably, the negative LCD display screen has a dark background color while the LCD display pattern is transparent or translucent.

Preferably, the LCD display screen is a positive LCD display screen, the drive device comprises a digital display module for generating a digital display control signal, a light intensity sensor for detecting an ambient brightness, a switch control module for generating a LCD display control signal or a LED display control signal based on the ambient brightness and a switch brightness, a LCD display control module for driving the positive LCD display screen to generate the LCD display pattern displaying the display number based on the digital display control signal and the LCD display control signal, and a LED display control module for driving the LED lamp of corresponding stroke in the LED pattern to emit light to generate the LED display pattern displaying the display number based on the digital display control signal and the LED display control signal.

Preferably, the positive LCD display screen has a transparent or translucent background color while the LCD display pattern is dark.

Preferably, the LED display screen comprises a PCB board arranged with the LED lamp, wherein a light colored scattering film is arranged on a surface of the LED display screen, wherein the light colored scattering film serves as a reflection film of the LCD display screen at the same time.

In a second aspect, a LCD and LED clock with a LCD and LED hybrid display screen is provided, which comprising a LCD display screen, a LED display screen arranged at a back side of the LCD display screen and overlapping with the LCD display screen, and a drive device for driving the LCD display screen and the LED display screen, wherein the LED display screen is provided with at least one LED pattern, wherein each LED pattern comprises a plurality of strokes and each stroke is corresponding to at least one LED lamp; wherein the LCD display screen is a negative LCD display screen, the drive device comprises a clock module for generating a time display control signal, a LCD display control module for driving the negative LCD display screen to generate a LCD display pattern displaying a display time based on the time display control signal, and a LED display control module for driving LED lamp of corresponding stroke in the LED pattern to emit light to generate a LED display pattern displaying the display time based on the time display control signal; wherein the LCD display pattern and the LED display pattern are in one-to-one correspondence and overlapping with each other.

In a third aspect, a LCD and LED clock with a LCD and LED hybrid display screen is provided, which comprising a LCD display screen, a LED display screen arranged at a back side of the LCD display screen and overlapping with the LCD display screen, and a drive device for driving the LCD display screen and the LED display screen, wherein the LED display screen is provided with at least one LED pattern, wherein each LED pattern comprises a plurality of strokes and each stroke is corresponding to at least one LED lamp; wherein the LCD display screen is a positive LCD display screen, the drive device comprises a clock module for generating a time display control signal, a light intensity sensor for detecting an ambient brightness, a switch control module for generating a LCD display control signal or a LED display control signal based on the ambient brightness and a switch brightness, a LCD display control module for driving the positive LCD display screen to generate a LCD display pattern displaying a display time based on the time display control signal and the LCD display control signal, and a LED display control module for driving LED lamp of corresponding stroke in the LED pattern to emit light to generate a LED display pattern displaying the display time based on the time display control signal and the LED display control signal, wherein the LCD display pattern and the LED display pattern are in one-to-one correspondence and overlapping with each other.

By implementing the LCD and LED hybrid display screen, and the LCD and LED clock with a LCD and LED hybrid display screen according to the present application, the different ambient brightness can be adapted while the power consumption can be reduced through overlapping the LCD display screen with the LED display screen. Furthermore, both of the defect that the LCD display screen cannot be read for the time when the ambient brightness is not enough, and the defect that the contrast of LED digital display screen becomes worse when the ambient brightness is very strong, can be compensated through displaying the display content by the LCD display screen and the LED display screen at the same time. In additional, the LCD display screen and the LED display screen can be switched for displaying according to the ambient brightness, so the clear display can be achieved at any brightness, while the power consumption can be greatly reduced for achieving the long-term endurance.

BRIEF DESCRIPTION OF THE DRAWINGS

The present application will be further described in combination with the drawings and the embodiments

DETAILED DESCRIPTION OF THE PREFERRED EMBODIMENT

In order to make the object, technical scheme and advantages of the present application more clear, the present application will be further described in detail in combination with the drawings and the embodiments. It should be understood that the specific embodiments described herein are only used to explain the present application and are not used to limit the present application.

The present application relates to a LCD and LED hybrid display screen which comprising a LCD display screen, a LED display screen arranged at a back side of the LCD display screen and overlapping with the LCD display screen, and a drive device for driving the LCD display screen and the LED display screen, wherein the LED display screen is provided with at least one LED pattern, wherein each LED pattern comprises a plurality of strokes and each stroke is corresponding to at least one LED lamp; wherein the drive device is used for driving the LCD display screen to display at least one LCD display pattern and driving the LED lamp to emit light, wherein a LED display pattern formed by a light emitted by the LED lamp and the LCD display pattern are in one-to-one correspondence.

Here, one-to-one correspondence means that one subject is above the other subject and the subjects can be overlapping with each other or not. Herein, it should be noted that overlapping with each other can mean that the sizes of the subjects are accurately the same and they can completely overlapping with each other, or the sizes of the subjects are similar and one is arranged above the other, such that they are partially overlapping with each other. By implementing the LCD and LED hybrid display screen according to the present application, the different ambient brightness can be adapted while the power consumption can be reduced through overlapping the LCD display screen with the LED display screen.

Figure 1:
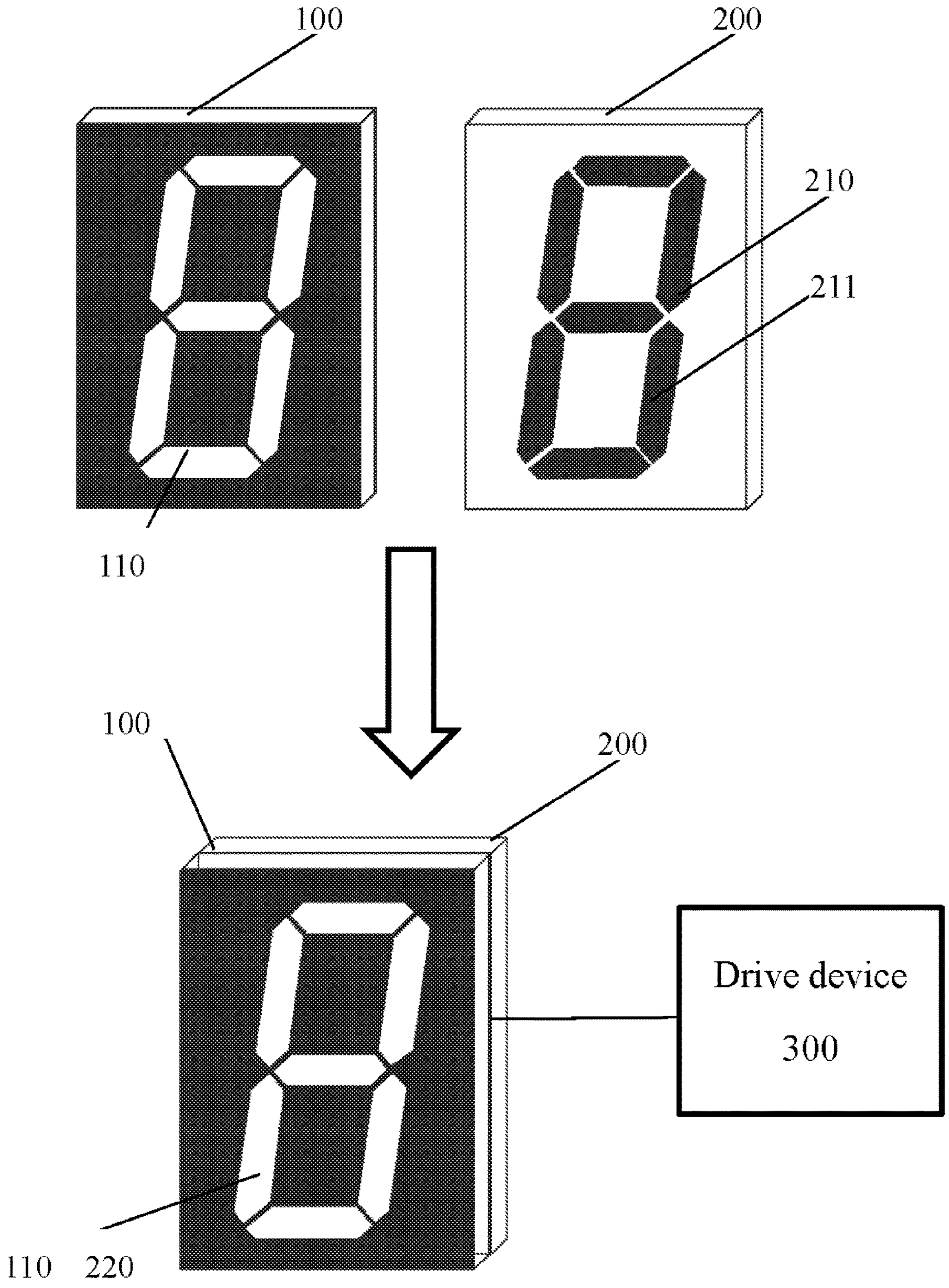
FIG. 1 is a combination diagram of the LCD and LED hybrid display screen according to a first embodiment of the present application.

FIG. 1 is a combination diagram of the LCD and LED hybrid display screen according to a first embodiment of the present application. As shown in FIG. 1, the LCD and LED hybrid display screen comprises a LCD display screen 100, a LED display screen 200 arranged at the back side of the LCD display screen 100 and overlapping with the LCD display screen 100, and a drive device 300 for driving the LCD display screen 100 and the LED display screen 200. The LED display screen 200 is provided with at least one LED pattern 210, wherein each LED pattern 210 comprises a plurality of strokes 211 and each stroke 211 is corresponding to at least one LED lamp 240 (referring FIG. 2). When the LCD display screen 100 is driven by the drive device 300 to be powered on, it would display at least one LCD display pattern 110. When the LED display screen 200 is driven by the drive device 300 to be powered on, the corresponding LED lamp 240 would emit light to form the LED display pattern 220. As shown in FIG. 1, the LED display pattern 220 formed by the emitted light of the LED lamp 240 and the LCD display pattern 110 are in one-to-one correspondence and overlapping with each other, such that, the LCD display pattern 110 and the LED display pattern 220 together constitute the display pattern of the LCD and LED hybrid display screen of the present application. In this way, by overlapping the LCD display screen with the LED display screen, the different ambient brightness can be adapted while the power consumption can be reduced.

Preferably, the sizes of the LCD display screen 100 and the LED display screen 200 are exactly the same, while the LCD display pattern 110 and the LED display pattern 220 are also exactly the same. Of course, in other preferred embodiments of the present application, the sizes of the LCD display screen 100 and the LED display screen 200 are different, while the LCD display pattern 110 and the LED display pattern 220 are slightly different. The LCD display screen 100 and the LED display screen 200 can be an integral structure formed by overlapping one LCD display screen 100 and one LED display screen 200, or can be formed two separate LCD display screen 100 and LED display screen 200 assembled in an overlapping way.

In the preferred embodiment of the present application, the LED display pattern 210 and the LCD display pattern 110 are display numbers, such as time display numbers, temperature display numbers, etc. In other preferred embodiments of the present application, the LED display pattern 210 and the LCD display pattern 110 can also be other display contents, such as petals, animal images, etc.

In the preferred embodiment of the present application, the LCD display screen 100, the LED display screen 200 and the drive device 300 can adopt any known LCD display screen, any known LED display screen, any known LCD/LED drive circuit or chip structure, in the present art. One skilled in the present art still can use any known LCD display screen, LED display screen and LCD/LED drive circuit or chip to realize the present application.

Figure 2:
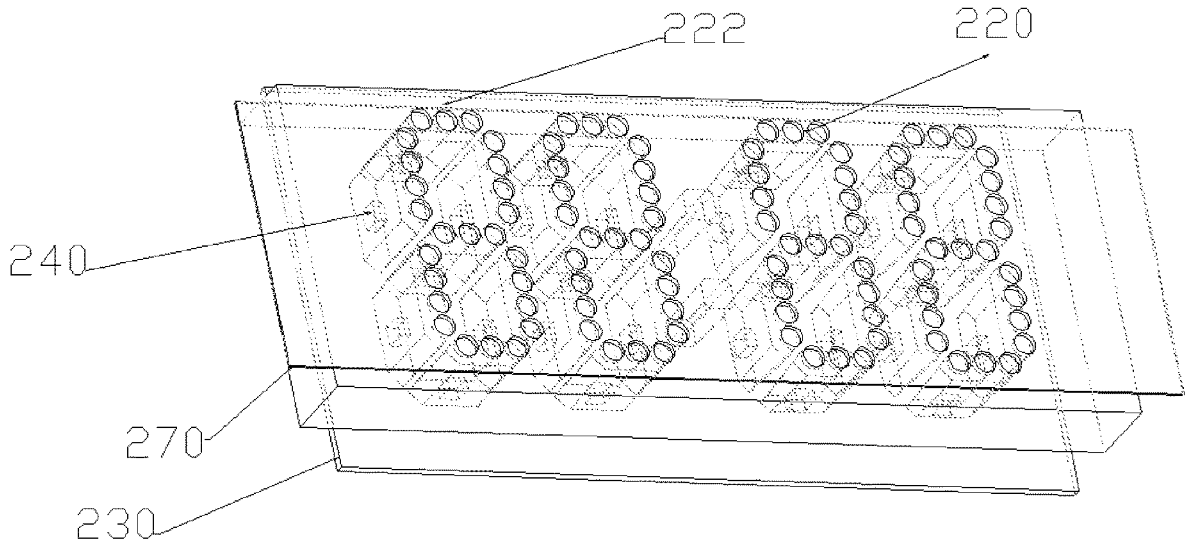
FIG. 2 is a structural diagram of a preferred embodiment of the LED display screen of the LCD and LED hybrid display screen shown in FIG. 1.

FIG. 2 is a structural diagram of a preferred embodiment of the LED display screen of the LCD and LED hybrid display screen shown in FIG. 1. As shown in FIG. 2, the LED display screen 200 comprises a PCB board 230 and a plurality of LED lamps 240 arranged on the PCB board 230. The LED pattern 210 is a light transmission structure, for example, each stroke 221 is composed of a group of light transmission holes 222. Of course, each stroke 221 can also be composed of one light transmission gap or a group of light transmission gaps, and each gap can correspond to one or more LED lamps 240. A scattering film 270 is arranged on the LED display screen 200, and the scattering film 270 is preferably white or light colored, which can also be used as a reflection film of the LCD display screen. The size of the scattering film 270 is preferably the same as or different from that of the LED display screen 200.

As shown in FIG. 2, the LED pattern 210 can be a time display number, which comprises four 8-shaped time display numbers composed of seven strokes 211, and each stroke 221 is composed of at least one group of light transmission holes 222. In a simplified embodiment of the present application, the light emitted by at least one of the LED lamps 240 is transmitted through the at least one group of light transmitting holes 222. In the preferred embodiment of the present application, at least one LED lamp 240 is arranged under each group of light transmitting holes 222 so that the light emitted by the LED lamp 240 can be transmitted from each group of light transmitting holes 222. As shown in the FIG. 2, each 8-shaped time display number is composed of seven strokes 211 which comprise three horizontal strokes 211 and four vertical strokes 211. Each horizontal stroke 211 comprises three light transmission holes 222 while each vertical stroke 211 comprises four light transmission holes 222, and the distance between each two light transmission holes 222 are the same. Correspondingly, the LCD display pattern 110 and the LED display pattern 220 formed by the light emitted by the corresponding LED can have the same size and be in one-to-one correspondence and overlapping with each other, such that the LCD display pattern 110 and the LED display pattern 220 together constitute the display pattern of the LCD and LED hybrid display screen of the present application.

In another preferred embodiment of the present application, 12-hour timing system is adopted, that is, timing from 00:00 o'clock to 12:00 o'clock. In this embodiment, the tens digit representing the hour just needs to display the numbers 1 and 0. Accordingly, in this embodiment, the LED pattern 210 comprises three 8-shaped display numbers composed of seven strokes 211 and at least one 1-shaped display number composed of at least one stroke 211, wherein each stroke 221 is composed of a group of light transmission holes 222. While the 1-shaped display number can comprise one long stroke 211 or two short strokes 211, while each stroke 221 is composed of a group of light transmission holes 222. In a further preferred embodiment of the present application, 24-hour timing system is adopted, that is, timing from 00:00 o'clock to 24:00 o'clock. In this embodiment, the tens digit representing the hour just needs to display the numbers 2, 1 and 0. Accordingly, in this embodiment, the LED pattern 210 comprises three 8-shaped display numbers composed of seven strokes 211 and at least one reversed S-shaped composed of six strokes 211. Each stroke 221 is composed of a group of light transmission holes 222.

In other preferred embodiments of the present application, the LED pattern 210 can be a temperature display number, which can comprise at least three 8-shaped display numbers composed of seven strokes and at least one 1-shaped display number composed of at least one stroke, or at least three 8-shaped display numbers composed of seven strokes and at least one reversed S-shaped composed of six strokes, or at least four 8-shaped display numbers composed of seven strokes.

Figure 3:
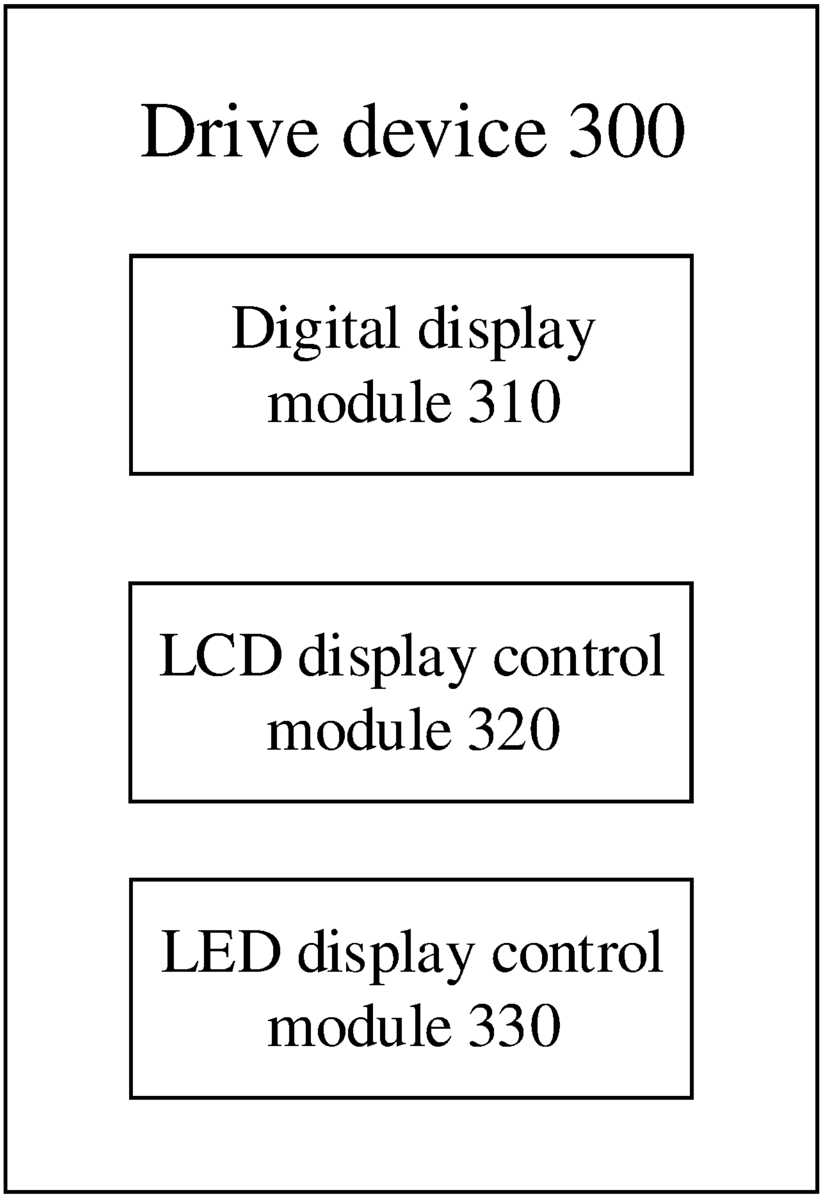
FIG. 3 is a circuit diagram of a preferred embodiment of the drive device of the LCD and LED hybrid display screen shown in FIG. 1.

In the preferable embodiment of the present application, the LCD display screen 100 is a negative LCD display screen. In the negative display LCD screen, the color of the display content should be lighter than the background color, such as white words on the blue background (blue screen), white words on the black background (VA segment code screen). This kind of screen has relatively high contrast, and its indoor display effect is better than that of the positive display LCD screen. For this implementation mode, the driver device 300 shown in FIG. 3 is preferred. As shown in FIG. 3, the drive device 300 comprises a digital display module 310, a LCD display control module 320 and a LED display control module 330. The digital display module 310 is used for generating a digital display control signal. The LCD display control module 320 is electrically connected with the digital display module 310 for receiving the digital display control signal and driving the negative LCD display screen 100 to generate the LCD display pattern 110 displaying the display number based on the digital display control signal. Meanwhile, the LED display control module 330 is also electrically connected with the digital display module 310 for driving the LED lamp 240 of corresponding stroke 211 in the LED pattern 210 to emit light to generate the LED display pattern 220 displaying the display number based on the digital display control signal. In the present preferable embodiment, the LCD display pattern 110 and the LED display pattern 220 formed by the light emitted by the corresponding LED can be in one-to-one correspondence and overlapping with each other, such that the LCD display pattern 110 and the LED display pattern 220 together constitute the display pattern of the LCD and LED hybrid display screen of the present application. In another preferable embodiment, the LCD display pattern 110 and the LED display pattern 220 are partially overlapping with each other, such as the LCD display pattern 110 is generally overlapping with each stroke of the LED display pattern 220, however they are slightly different in the sizes. One skilled in the present art know that any processor, chip, circuit and module known in the present art can be used to construct the digital display module 310, LCD display control module 320 and LED display control module 330.

In a preferable embodiment, the negative LCD display screen 100 has a dark background color while the LCD display pattern 110 is transparent or translucent. In this way, the color of the display pattern of the LCD and LED hybrid display screen would be the same as that of the light emitted by the LED lamp. Preferably, the LED display screen 200 is further provided with a scattering film 270, which is preferably white and serves as a reflection film of the LCD display screen 100 at the same time.

In the preferred embodiment of the present application, the digital display module 310 can be any known clock module, temperature detection module, humidity detection module and any other circuit, chip or module that can generate a digital display control signal to control the LCD display control module 320 and LED display control module 330 for the digital display.

The LCD and LED hybrid display screen of the present application makes up for the shortcomings that the ordinary LCD screen cannot be read for the time in the dark environment, the contrast of LED digital display screen becomes worse and the visual effect is deteriorated when the ambient brightness is very strong, such that the display content can be obtained conveniently in the different ambient brightness while the power consumption can be reduced. Accordingly, the products adopting the LCD and LED hybrid display screen can have a long battery life. The LCD and LED hybrid display screen of the present application actually combines the advantages of the light-emitting display screen and non light-emitting display screen, complements their advantages and avoids their disadvantages. In additional, as the power consumption is reduced, it is possible for the products adopting this LCD and LED hybrid display screen to work for a long time in the mode of being powered on by the battery only. Therefore, it can be applied to portable products that only use batteries and should work for a long time.

Figure 4:
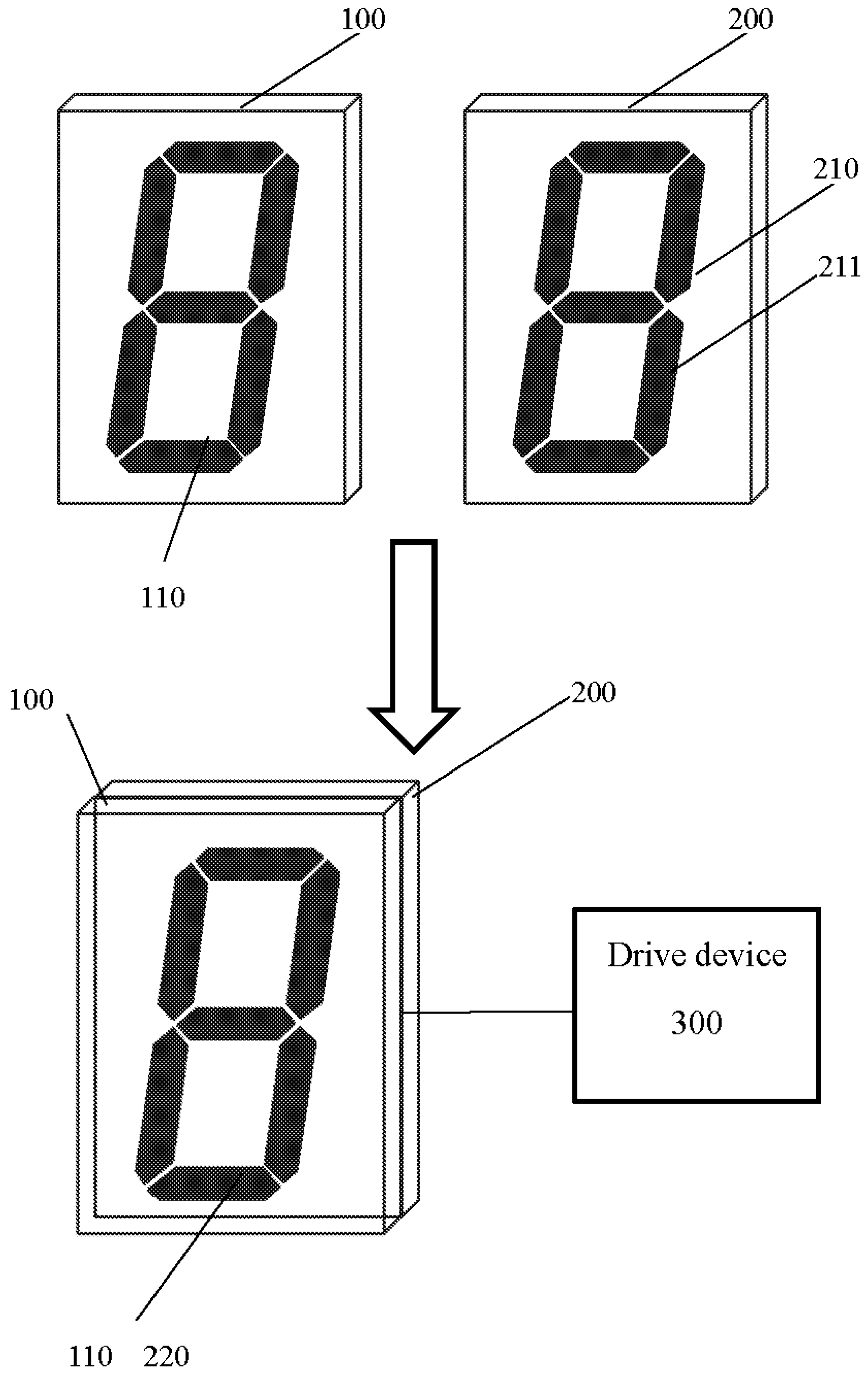
FIG. 4 is a combination diagram of the LCD and LED hybrid display screen according to a second embodiment of the present application.

FIG. 4 is a combination diagram of the LCD and LED hybrid display screen according to a second embodiment of the present application. As shown in FIG. 4, the LCD and LED hybrid display screen comprises a LCD display screen 100, a LED display screen 200 arranged at a back side of the LCD display screen 100 and overlapping with the LCD display screen 100, and a drive device 300 for driving the LCD display screen 100 and the LED display screen 200. The LED display screen 200 is provided with at least one LED pattern 210, wherein each LED pattern 210 comprises a plurality of strokes 211 and each stroke 211 is corresponding to at least one LED lamp (referring FIG. 2). When the LCD display screen 100 is driven by the drive device 300 to be powered on, it would display at least one LCD display pattern 110. When the LED display screen 200 is driven by the drive device 300 to be powered on, the corresponding LED lamp would emit light to form the LED display pattern 220.

Preferably, the sizes of the LCD display screen 100 and the LED display screen 200 are exactly the same, while the LCD display pattern 110 and the LED display pattern 220 are also exactly the same. Of course, in other preferred embodiments of the present application, the sizes of the LCD display screen 100 and the LED display screen 200 are different, while the LCD display pattern 110 and the LED display pattern 220 are slightly different, such as they can be partially overlapping with each other, completely overlapping with each other, or completely not overlapping with each other, that is the LCD display pattern 110 can be arranged at any location above the LED display pattern 220. The LCD display screen 100 and LED display screen 200 can be an integral structure formed by overlapping one LCD display screen 100 and one LED display screen 200, or can be formed two separate LCD display screen 100 and LED display screen 200 assembled in an overlapping way.

In the preferable embodiment shown in FIG. 4, the LCD display screen 100 is a positive LCD display screen 100. In the present embodiment, the LED display pattern 22 can be constructed referring the embodiment shown in FIG. 2, while the drive device 300 can be constructed according to FIG. 5.

Figure 5:
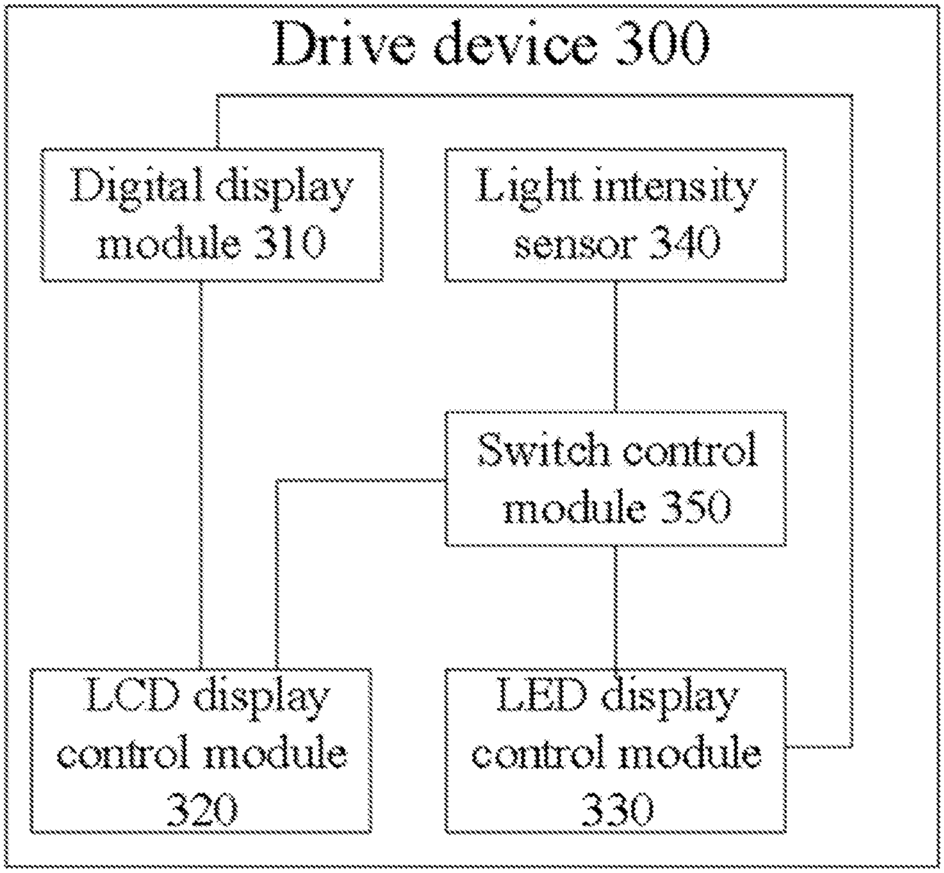
FIG. 5 is a circuit diagram of a preferred embodiment of the drive device of the LCD and LED hybrid display screen shown in FIG. 4.

In the positive LCD display screen 100, the color of the display content should be deeper than the background color, such as black words on yellow green background (yellow green screen) and black words on gray white background (FSTN screen). This kind of screen has better display effect in sunlight. In this embodiment, it is preferred that the background color of the positive LCD display screen 100 is transparent or translucent, and the LCD display pattern 110 has a dark color. As shown in FIG. 5, the drive device 300 comprises a digital display module 310, a light intensity sensor 340, a switch control module 350, a LCD display control module 320 and a LED display control module 330. The digital display module 310 is used for generating a digital display control signal. The light intensity sensor 340 is used for detecting an ambient brightness. The switch control module 350 is electrically connected with the light intensity sensor 340 for receiving the ambient brightness and generating a LCD display control signal or a LED display control signal based on the ambient brightness and a switch brightness. For example, when the ambient brightness is greater than the preset switch brightness, it indicates that the ambient brightness is relatively high and it is preferred to use the positive LCD display screen 100 for displaying, so the switch control module 350 generates the LCD display control signal. When the ambient brightness is less than the preset switch brightness, it indicates that the ambient brightness is relatively low and it is preferred to use the LED display screen 200 for displaying, so the switch control module 350 generates the LED display control signal. The LCD display control module 320 is respectively connected with the digital display module 310 and the switch control module 350, thus driving the positive LCD display screen 100 to generate the LCD display pattern 110 displaying the display number based on the digital display control signal and the LCD display control signal. The LED display control module 330 is respectively connected with the digital display module 310 and the switch control module 350, thus driving the LED lamp 240 of corresponding stroke 211 in the LED pattern 210 emit light to generate the LED display pattern 220 displaying the display number based on the digital display control signal and the LED display control signal.

Preferably, the light intensity sensor 340 can adopt any light intensity sensor known in the present art. One skilled in the present art knows that any processor, chip, circuit and module known in the present art can be used to construct the digital display module 310, LCD display control module 320 and LED display control module 330. The switch control module 350 can be constructed by a low-power microprocessor, a micro chip, a power management circuit/module/chip and corresponding peripheral circuits. When the ambient brightness becomes dark, the visual effect of the LCD display screen becomes worse, then the switch control module 350 switches to the LED display screen, whose LED lamps emit light for displaying. On the contrary, when the ambient brightness is too bright, the contrast of the LED display screen is reduced and the visual effect becomes worse, the switch control module 350 automatically switches to the LCD display screen for displaying.

In the preferred embodiment of the present application, the digital display module 310 can be any known clock module, temperature detection module, humidity detection module and any other circuit, chip or module that can generate a digital display control signal to control the LCD display control module 320 and LED display control module 330 for the digital display.

By implementing the LCD and LED hybrid display screen, the different ambient brightness can be adapted while the power consumption can be reduced through overlapping the LCD display screen with the LED display screen. Furthermore, both of the defect that the LCD display screen cannot be read for the time when the ambient brightness is not enough, and the defect that the contrast of LED digital display screen becomes worse when the ambient brightness is very strong, can be compensated through displaying the time by the LCD display screen and the LED display screen at the same time. In additional, the LCD display screen and the LED display screen can be switched for displaying according to the ambient brightness, so the clear display can be achieved at any brightness, while the power consumption can be greatly reduced for achieving the long-term endurance.

Figure 6:
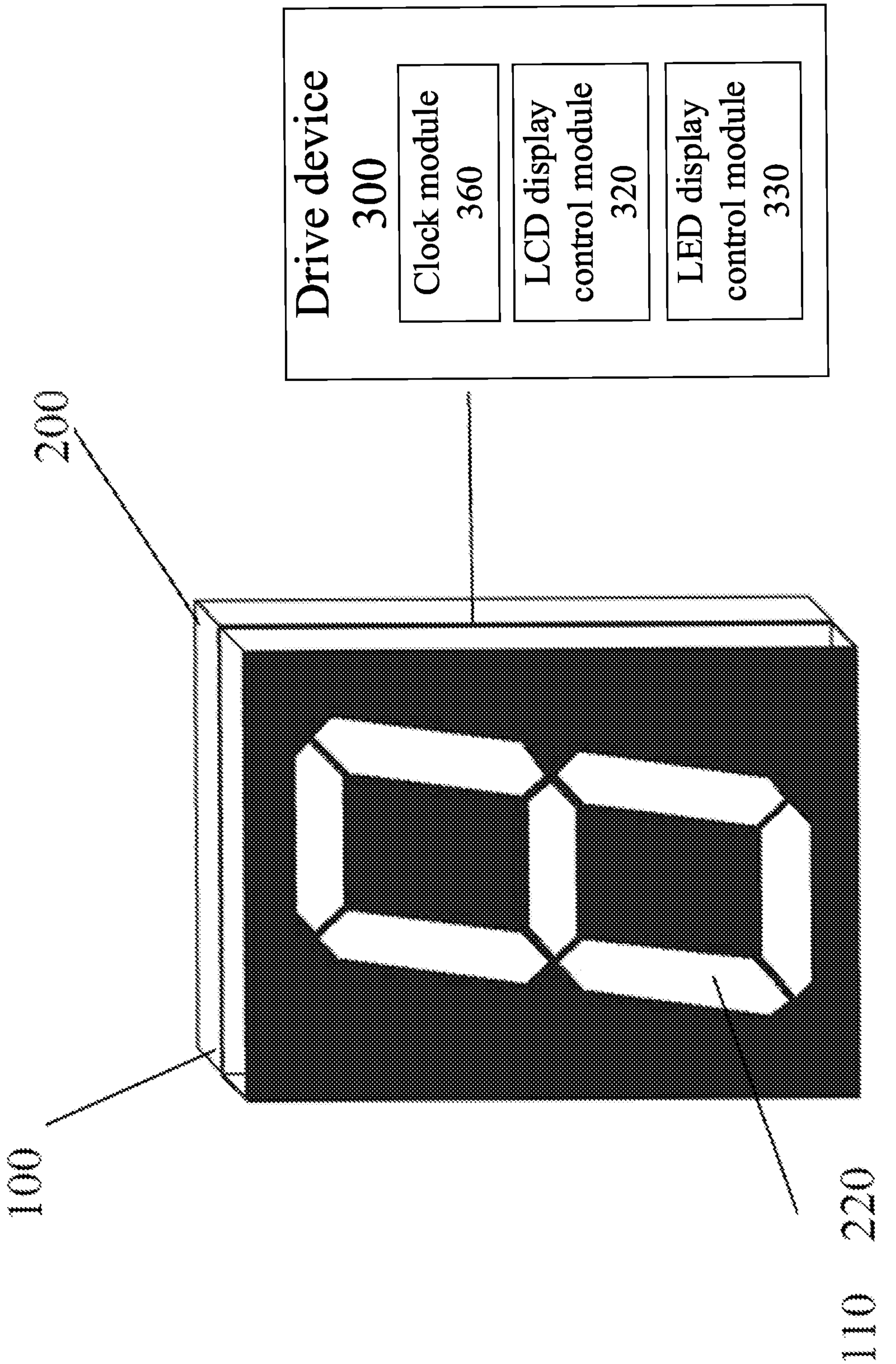
FIG. 6 is a combination diagram of the LCD and LED clock with a LCD and LED hybrid display screen according to a first embodiment of the present application.

FIG. 6 is a combination diagram of the LCD and LED clock with a LCD and LED hybrid display screen according to a first embodiment of the present application. As shown in FIG. 6, the LCD and LED clock with a LCD and LED hybrid display screen comprises a LCD display screen 100, a LED display screen 200 arranged at a back side of the LCD display screen 100 and overlapping with the LCD display screen 100, and a drive device 300 for driving the LCD display screen 100 and the LED display screen 200. The LED display screen 200 is provided with at least one LED pattern 210, wherein each LED pattern 210 comprises a plurality of strokes 211 and each stroke 211 is corresponding to at least one LED lamp. The drive device 300 comprises a clock module 360, a LCD display control module 320 and a LED display control module 330. The clock module 360 is used for generating a time display control signal. In the present embodiment, the LCD display screen 100 is a negative LCD display screen. The LCD display control module 320 is electrically connected with the clock module 360 for receiving the time display control signal and driving the negative LCD display screen 100 to generate a LCD display pattern 110 displaying a display time based on the time display control signal. Meanwhile, the LED display control module 330 is also electrically connected with the clock module 360 for receiving the time display control signal and driving the LED lamp 240 of corresponding stroke 211 in the LED pattern 210 to emit light to generate a LED display pattern 220 displaying the display time based on the time display control signal. As the LCD display pattern 110 and the LED display pattern 220 are in one-to-one correspondence and overlapping with each other, the LCD display pattern 110 and the LED display pattern 220 together constitute the display pattern of the LCD and LED clock with a LCD and LED hybrid display screen of the present application. One skilled in the present art knows that, the LCD and LED hybrid display screen of the LCD and LED clock with a LCD and LED hybrid display screen of the present application can be constructed according to the embodiments shown in FIGS. 1-3, and won't be repeated here.

Figure 7:
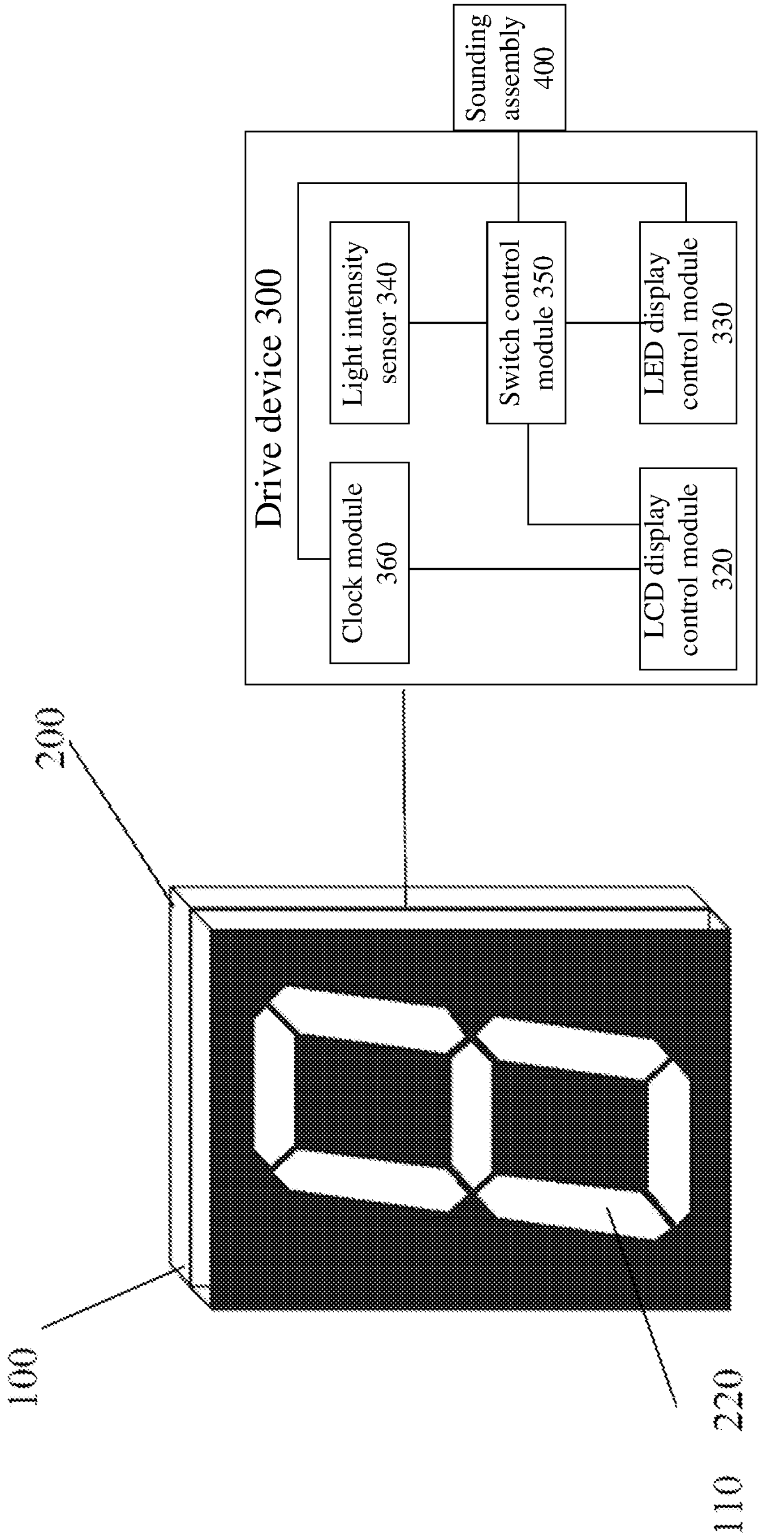
FIG. 7 is a combination diagram of the LCD and LED clock with a LCD and LED hybrid display screen according to a second embodiment of the present application.

FIG. 7 is a combination diagram of the LCD and LED clock with a LCD and LED hybrid display screen according to a second embodiment of the present application. As shown in FIG. 7, the LCD and LED clock with a LCD and LED hybrid display screen comprises a LCD display screen 100, a LED display screen 200 arranged at a back side of the LCD display screen 100 and overlapping with the LCD display screen 100, and a drive device 300 for driving the LCD display screen 100 and the LED display screen 200. The LED display screen 200 is provided with at least one LED pattern 210, wherein each LED pattern 210 comprises a plurality of strokes 211 and each stroke 211 is corresponding to at least one LED lamp. In the present embodiment, the LCD display screen 100 is a positive LCD display screen 100. The drive device 300 comprises a clock module 360, a light intensity sensor 340, a switch control module 350, a LCD display control module 320 and a LED display control module 330. The clock module 360 is used for generating a time display control signal. The light intensity sensor 340 is used for detecting an ambient brightness. The switch control module 350 is electrically connected with the light intensity sensor 340 for receiving the ambient brightness and generating a LCD display control signal or a LED display control signal based on the ambient brightness and a switch brightness. For example, when the ambient brightness is greater than the preset switch brightness, it indicates that the ambient brightness is relatively high and it is preferred to use the positive LCD display screen 100 for displaying, so the switch control module 350 generates the LCD display control signal. When the ambient brightness is less than the preset switch brightness, it indicates that the ambient brightness is relatively low and it is preferred to use the LED display screen 200 for displaying, so the switch control module 350 generates the LED display control signal. The LCD display control module 320 is respectively connected with the clock module 360 and the switch control module 350, thus driving the positive LCD display screen 100 to generate a LCD display pattern 110 displaying a display time based on the time display control signal and the LCD display control signal. The LED display control module 330 is respectively connected with the clock module 360 and the switch control module 350, thus driving the LED lamp 240 of corresponding stroke 211 in the LED pattern 210 to emit light to generate a LED display pattern 220 displaying the display time based on the time display control signal and the LED display control signal. One skilled in the present art knows that, the LCD and LED hybrid display screen of the LCD and LED clock with a LCD and LED hybrid display screen of the present application can be constructed according to the embodiments shown in FIGS. 4-5, and won't be repeated here.

In a further preferable embodiment of the present application, the LCD and LED clock with a LCD and LED hybrid display screen further comprises a sounding assembly 400 for providing an alarm function under the control of the switch control module 350.

Therefore, the application can be realized by hardware, software or combination of software and hardware. The present disclosure may be implemented in a centralized manner in at least one computer system or in a decentralized manner by different parts distributed in several interconnected computer systems. Any computer system or other equipment that can realize the method of the application is applicable. The combination of commonly used software and hardware can be a general-purpose computer system installed with computer programs, and the computer system can be controlled by installing and executing programs to make it run according to the method of the application.

Although the present disclosure is illustrated by specific embodiments, those skilled in the present art should understand that various transformations and equivalent substitutions can be made to the disclosure without departing from the scope of the present disclosure. In addition, various modifications can be made to the present disclosure for specific situations or materials without departing from the scope of the disclosure. Therefore, the disclosure is not limited to the specific embodiments disclosed, but should include all the embodiments falling within the scope of the claims of the disclosure.

The above disclosure is just preferable embodiments and does not limit the present disclosure. Any modification, equivalent replacement and improvement made within the spirit and principle of the present disclosure shall be included in the protection scope of the present disclosure.

The invention claimed is:

1. A LCD and LED hybrid display screen comprising a LCD display screen, a LED display screen arranged at a back side of the LCD display screen and overlapping with the LCD display screen, and a drive device for driving the LCD display screen and the LED display screen, wherein the LED display screen is provided with at least one LED pattern, wherein each LED pattern comprises a plurality of strokes and each stroke is corresponding to at least one LED lamp; wherein the drive device is used for driving the LCD display screen to display at least one LCD display pattern and driving the LED lamp to emit light, wherein a LED display pattern formed by a light emitted by the LED lamp and the LCD display pattern are in one-to-one correspondence and overlapping with each other, such that the LCD display pattern and the LED display pattern together constitute a display pattern of the LCD and LED hybrid display screen;

wherein the LCD display screen is a negative LCD display screen, the drive device comprises a digital display module for generating a digital display control signal, a LCD display control module for driving the negative LCD display screen to generate the LCD display pattern displaying a display number based on the digital display control signal, and a LED display control module for driving the LED lamp of corresponding stroke in the LED pattern to emit light to generate the LED display pattern displaying the display number based on the digital display control signal; or wherein the LCD display screen is a positive LCD display screen, the drive device comprises a digital display module for generating a digital display control signal, a light intensity sensor for detecting an ambient brightness, a switch control module for generating a LCD display control signal or a LED display control signal based on the ambient brightness and a switch brightness, a LCD display control module for driving the positive LCD display screen to generate the LCD display pattern displaying a display number based on the digital display control signal and the LCD display control signal, and a LED display control module for driving the LED lamp of corresponding stroke in the LED pattern to emit light to generate the LED display pattern displaying the display number based on the digital display control signal and the LED display control signal.

2. The LCD and LED hybrid display screen according to claim 1, wherein the LED display pattern and the LCD display pattern are a display number.

3. The LCD and LED hybrid display screen according to claim 2, wherein the display number comprises at least three 8-shaped display numbers composed of seven strokes and at least one 1-shaped display number composed of at least one stroke, or at least three 8-shaped display numbers composed of seven strokes and at least one reversed S-shaped composed of six strokes, or at least four 8-shaped display numbers composed of seven strokes.

4. The LCD and LED hybrid display screen according to claim 1, wherein the negative LCD display screen has a dark background color while the LCD display pattern is transparent or translucent.

5. The LCD and LED hybrid display screen according to claim 1, wherein the positive LCD display screen has a transparent or translucent background color while the LCD display pattern is dark.

6. The LCD and LED hybrid display screen according to claim 1, wherein the LED display screen comprises a PCB board arranged with the LED lamp, wherein a light colored scattering film is arranged on a surface of the LED display screen, wherein the light colored scattering film serves as a reflection film of the LCD display screen at the same time.

7. A LCD and LED clock with a LCD and LED hybrid display screen comprising a LCD display screen, a LED display screen arranged at a back side of the LCD display screen and overlapping with the LCD display screen, and a drive device for driving the LCD display screen and the LED display screen, wherein the LED display screen is provided with at least one LED pattern, wherein each LED pattern comprises a plurality of strokes and each stroke is corresponding to at least one LED lamp; wherein the LCD display screen is a negative LCD display screen, the drive device comprises a clock module for generating a time display control signal, a LCD display control module for driving the negative LCD display screen to generate a LCD display pattern displaying a display time based on the time display control signal, and a LED display control module for driving LED lamp of corresponding stroke in the LED pattern to emit light to generate a LED display pattern displaying the display time based on the time display control signal; wherein the LCD display pattern and the LED display pattern are in one-to-one correspondence and overlapping with each other such that the LCD display pattern and the LED display pattern together constitute a display pattern of the LCD and LED clock with a LCD and LED hybrid display screen;

wherein the LCD display screen is a negative LCD display screen, the drive device comprises a digital display module for generating a digital display control signal, a LCD display control module for driving the negative LCD display screen to generate the LCD display pattern displaying a display number based on the digital display control signal, and a LED display control module for driving the LED lamp of corresponding stroke in the LED pattern to emit light to generate the LED display pattern displaying the display number based on the digital display control signal; or wherein the LCD display screen is a positive LCD display screen, the drive device comprises a digital display module for generating a digital display control signal, a light intensity sensor for detecting an ambient brightness, a switch control module for generating a LCD display control signal or a LED display control signal based on the ambient brightness and a switch brightness, a LCD display control module for driving the positive LCD display screen to generate the LCD display pattern displaying a display number based on the digital display control signal and the LCD display control signal, and a LED display control module for driving the LED lamp of corresponding stroke in the LED pattern to emit light to generate the LED display pattern displaying the display number based on the digital display control signal and the LED display control signal.

8. A LCD and LED clock with a LCD and LED hybrid display screen comprising a LCD display screen, a LED display screen arranged at a back side of the LCD display screen and overlapping with the LCD display screen, and a drive device for driving the LCD display screen and the LED display screen, wherein the LED display screen is provided with at least one LED pattern, wherein each LED pattern comprises a plurality of strokes and each stroke is corresponding to at least one LED lamp; wherein the LCD display screen is a positive LCD display screen, the drive device comprises a clock module for generating a time display control signal, a light intensity sensor for detecting an ambient brightness, a switch control module for generating a LCD display control signal or a LED display control signal based on the ambient brightness and a switch brightness, a LCD display control module for driving the positive LCD display screen to generate a LCD display pattern displaying a display time based on the time display control signal and the LCD display control signal, and a LED display control module for driving LED lamp of corresponding stroke in the LED pattern to emit light to generate a LED display pattern displaying the display time based on the time display control signal and the LED display control signal, wherein the LCD display pattern and the LED display pattern are in one-to-one correspondence and overlapping with each other such that the LCD display pattern and the LED display pattern together constitute a display pattern of the LCD and LED clock with a LCD and LED hybrid display screen;

wherein the LCD display screen is a negative LCD display screen, the drive device comprises a digital display module for generating a digital display control signal, a LCD display control module for driving the negative LCD display screen to generate the LCD display pattern displaying a display number based on the digital display control signal, and a LED display control module for driving the LED lamp of corresponding stroke in the LED pattern to emit light to generate the LED display pattern displaying the display number based on the digital display control signal; or wherein the LCD display screen is a positive LCD display screen, the drive device comprises a digital display module for generating a digital display control signal, a light intensity sensor for detecting an ambient brightness, a switch control module for generating a LCD display control signal or a LED display control signal based on the ambient brightness and a switch brightness, a LCD display control module for driving the positive LCD display screen to generate the LCD display pattern displaying a display number based on the digital display control signal and the LCD display control signal, and a LED display control module for driving the LED lamp of corresponding stroke in the LED pattern to emit light to generate the LED display pattern displaying the display number based on the digital display control signal and the LED display control signal.

* * * * *